Sept. 1, 1970 E. L. DROM 3,526,712

COIL MOUNTING ASSEMBLY

Filed April 8, 1968

INVENTOR
E. L. DROM

BY W. Dosse'
ATTORNEY

United States Patent Office 3,526,712

Patented Sept. 1, 1970

3,526,712

COIL MOUNTING ASSEMBLY

Edwin L. Drom, Glen Ellyn, Ill., assignor to Western Electric Company, Incorporated, New York, N.Y., a corporation of New York Filed Apr. 8, 1968, Ser. No. 719,314
Int. Cl. H01f *17/08, 27/30*
U.S. Cl. 178—46 7 Claims

ABSTRACT OF THE DISCLOSURE

An assembly for mounting electrical coils onto a stub length of a telephone cable, comprising a cylindrically-shaped sleeve capable of fitting over the stub cable and having provisions at each end thereof for nesting with adjacent mounting assemblies along the length of the stub cable. A plurality of short coil mounts extend radially from the outside surface of the cylindrical sleeve, and a toroidal coil assembly is mounted on each coil mount with the coil mount extending through the central opening of the electrical coil and latching it to prevent its easy removal from the coil mount.

BACKGROUND OF TH EINVENTION

Field of the invention

This invention relates to mounting assemblies and more particularly to an assembly for mounting electrical coils.

Description of the prior art

In telephony the two wires of a telephone transmission line that extends from the central station to the subscriber's premises contain sufficient capacitance to distort the voice signals transmitted thereon. To correct these distortions this capacitance must be neutralized, and this is accomplished by inductors (called loading coils) that are placed in series with the telephone line at intervals of approximately every 6000 feet and must be mounted along with the telephone line that extends underground or from telephone pole to telephone pole.

These loading coils can physically be mounted and arranged on the transmission line in many different ways. An example of one way of mounting these coils is shown in U.S. Pat. 2,079,697 granted to J. E. Ranges on May 11, 1937. In the mounting disclosed in the Ranges patent, a stub cable is spliced into the transmission line and extends through the cores of a plurality of loading coils. The coils and the end of the stub cable are encased in a hermetically sealed can which is mounted on the telephone line or on the adjacent telephone pole, near the splice. The mounting shown in the Ranges patent is predicated upon the cable diameter being less than the inside diameter of the coil. In addition, if one of the coils is found to be defective after all of the coils have been mounted and wired to the stub cable, it is difficult to remove and replace the defective coil. There are many other methods available for mounting loading coils around the outside of the cable or in frames positioned around or beyond the end of the stub cable. Such methods usually preclude easy replacement of defective coils and are expensive, cumbersome, or difficult to manufacture reliably.

It is an object of the present invention to provide a simple, reliable and inexpensive mounting for electrical coils.

It is another object of the present invention to mount telephone loading coils around the periphery of a stub cable compactly and inexpensively.

It is a further object of the present invention to mount an electrical coil and to facilitate its easy removal if defective.

SUMMARY OF THE INVENTION

In accordance with the present invention, and assembly for mounting electrical coils about an object having an axis comprises a sleeve extending over the object and having means on the sleeve for mounting a plurality of coils with the axes of the coils extending perpendicular to the axis of the object.

BRIEF DESCRIPTION OF THE DRAWINGS

A more complete understanding of the invention may be had by referring to the following detailed description when considered in conjunction with the accompanying drawing wherein like reference numbers refer to similar or the same parts in the several views, in which.

DETAILED DESCRIPTION

Figures 1, 2, 3, 4:
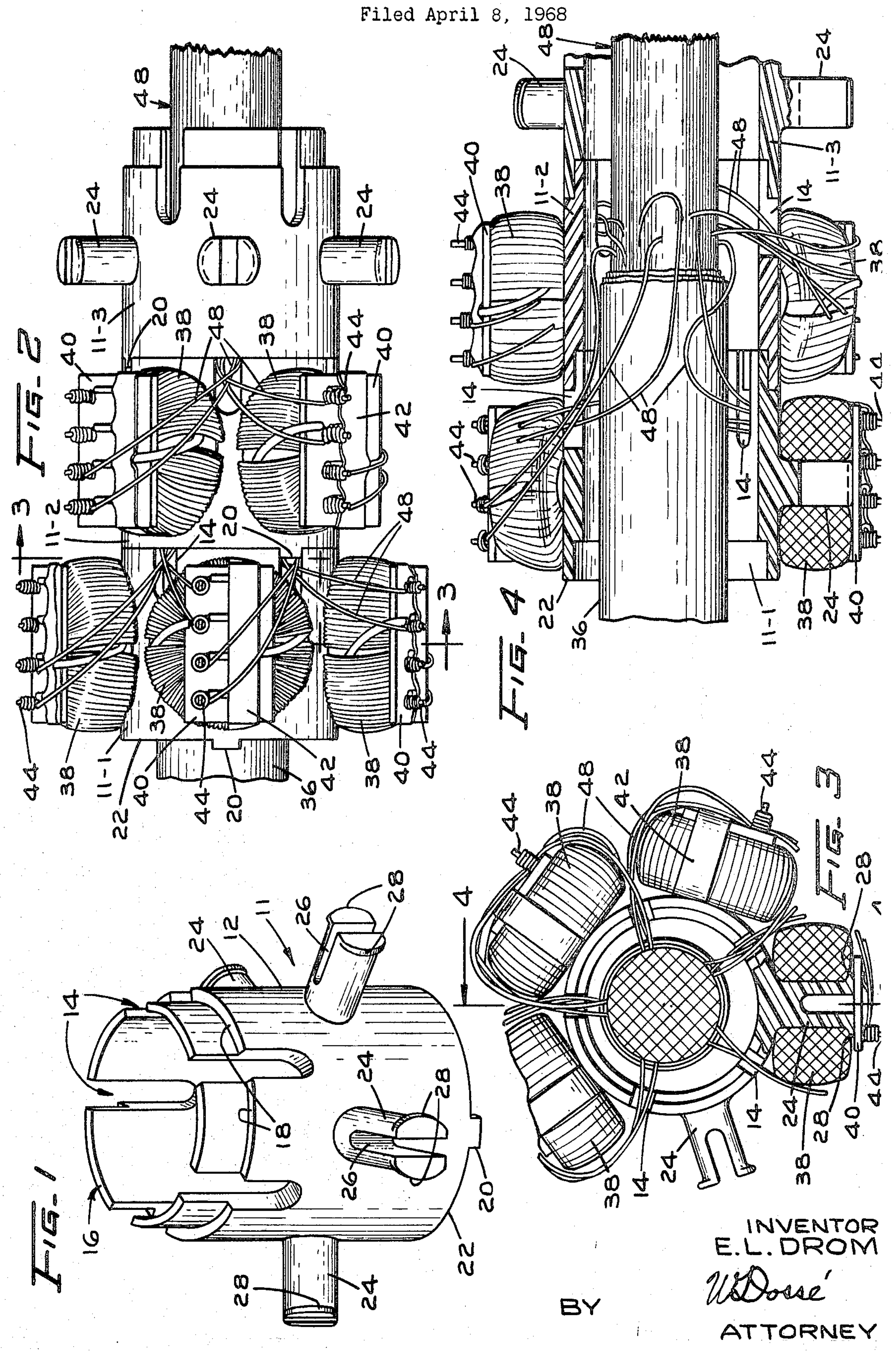
FIG. 1 shows the mounting assembly alone, without any loading coils or the stub cable.
FIG. 2 shows three mounting assemblies positioned so as to nest with one another at the end of a stub cable and shows loading coils mounted on two of the three mounting assemblies.
FIG. 3 is a cross-sectional view of one of the mounting assemblies shown with loading coils positioned thereon and is taken along line 3—3 of FIG. 2.
FIG. 4 is a cross-sectional view of the mounting assemblies, their associated loading coils, and the stub cable in the position shown in FIG. 2 and taken along line 4—4 of FIG. 3.

Referring now to the drawing and more particularly to FIG. 1, the loading-coil mounting assembly 11 is shown without any loading coils mounted thereon. This assembly comprises a cylindrical plastic sleeve 12 having five notches 14 formed longitudinally in the sleeve 12 at one end 16 thereof. The outside diameter of the cylindrical sleeve 12 at the end 16 is reduced slightly so that the wall thickness of the sleeve 12 near the end 16 is equal to or slightly less than one-half the nominal wall thickness of the sleeve 12. This diameter reduction produces a shoulder 18 where the cylindrical base changes outside surface geometry. The notches 14 extend well beyond the shoulder 18.

A projection 20 extends from the other end 22 of the plastic sleeve 12 and is no wider than the smallest permissible width of any one of the five notches 14. The projection 20 is located on a longitudinal line midway between two notches 14. Therefore, when adjacent assemblies 11 are nested together along a stub cable, the projection 20 of one assembly fits into anotch 14 in the adjacent assembly; and the notches 14 on one assembly 11 are positioned circumferentially between the notches 14 on the other assembly yet are displaced longitudinally by approximately the length of an assembly.

Five flexible, plastic coil mounts 24 are attached to the sleeve 12 equidistantly around its periphery on longitudinal lines that are approximately midway between the notches 14 and on a circumferential line approximately midway between the shoulder 18 and the end 22 of the cylindrical sleeve 12.

Each coil mount 24 is a plastic rod that may be formed integrally with the sleeve 12 and that has an axially-directed notch 26 extending part way along its length and completely across its diameter, thereby bifurcating each mount 24. This notch lends flexibility to the rod and permits the two outer ends of a mount to be flexed toward one another.

Two flanges 28 are formed to extend circumferentially outwardly at the end of a bifurcated mount 24 to prevent easy removal of anything mounted on it.

When a toroidal loading coil is to be mounted on a coil mount 24, the bifurcated ends are pressed together until the maximum width across the flanges 28 is less than the inside diameter of the toroidal loading coil, and the coil is slipped onto the mount 24. When the loading coil is completely mounted on the mount 24, the bifurcated ends of the mount 24 are released, and they spring apart so that the flanges 28 overlap the inside surfaces of the coil, latching it onto the coil mount 24. Simply flexing the bifurcated ends together again facilitates easy removal of the coil over the flanges 28.

Referring now to FIGS. 2, 3 and 4, three of the coil-mounting assemblies 11–1, 11–2, and 11–3 are shown positioned around and substantially coaxial with one end of a stub cable 36 that extends at the left hand ends of FIGS. 2 and 4 to a splice in a multiple-pair telephone cable. The leftmost two assemblies 11–1, 11–2 are shown with loading coils 38 mounted on them. The rightmost assembly 11–3 is shown without loading coils.

As best shown in FIG. 4, in addition to the area of reduced outside surface diameter at the one end 16 of the cylindrical sleeve 12 as shown in FIG. 1, each assembly 11 has at its other end 22 an area of increased inside surface diameter, thereby reducing the wall thickness of the end 22 of the cylindrical sleeve 12 to a thickness equal to or slightly less than one-half of the nominal thickness of the cylindrical sleeve 12. Therefore, when the assemblies are put together as shown in FIGS. 2 and 4 their adjacent areas of reduced wall thickness overlap by an amount approximately equal to the axial length of the area of reduced wall thickness, causing the assemblies 11 to nest with each other. Since the projection 20 (FIGS. 1 and 2) is longitudinally positioned midway between two notches 14, it is in line with one of the coil mounts 24. Consequently, when two assemblies 11 are nested together on the stub cable 36 (as shown in FIGS. 2 and 4) and when the projection 20 of one assembly 11 is positioned in a notch 14 of the adjacent assembly, the loading coils on one assembly 11 are circumferentially staggered with respect to the loading coils on the adjacent assembly 11.

Referring now to FIG. 3, wherein only four of the five possible loading coils 38 are shown in position, and more specifically to the lowermost loading coil thereof, the inside diameter of the loading coil 38 is approximately equal to the outside diameter of the coil mount 24. The flanges 28 are shown extending beyond the inside diameter of the coil 28 in order to latch it onto the mount 24. A terminal board 40 is mounted onto each loading coil 38 by a spring clip 42 (best shown in FIGS. 2 and 3) that extends around the sides of the loading coil. Each terminal board contains four upstanding, mutually-insulated, metal terminals 44 around which the ends of the wires of the loading coil are wrapped. These upstanding terminals 44 are in an accessible position to facilitate easy wiring and disconnecting of the coils.

The sheathing of the stub cable 36 is normally stripped for some distance from the end thereof to expose the wires 48 inside the cable. These wires are then passed (FIGS. 2, 3 and 4) through the open portions of the notches 14 of the assemblies 11 remaining after adjacent assemblies are nested. The ends of the wires 48 are wrapped around terminals 44 to make electrical connection with the wires of their associated loading coils 38.

After all electrical connections have been made between the stub cable 36 and the loading coils 38, these loading coils are tested to assure that all are functioning properly; and any changes necessitated by malfunctioning of a loading coil or its connecting wiring can be corrected with only slight cost in labor and materials since the coils and the terminal boards are in accessible positions, and a deflective coil can be replaced without interfering with adjacent coils. After testing, the end of the stub cable 36 containing the loading coils 38 and the mounting assemblies 11 is placed in a hermetically sealed can such, for example, as that shown in the above-mentioned Ranges patent, and the stub cable is spliced into a telephone transmission line.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An assembly for mounting in juxtaposition to an object having an axis, electrical coils each having a central opening with an axis, comprising:

a sleeve having an axis parallel with the axis of the object and having a central opening for accommodating the object, said sleeve mounted around the object and further including a first extension at one end thereof with an increased inside diameter and another extension at the other end thereof having a circular configuration with an outside diameter substantially the same as the inside diameter of the first extension, to facilitate nesting of a plurality of said sleeves about the object, and means on said sleeve for mounting a plurality of coils with the axes of the coils extending perpendicular to the axis of the object.

2. An assembly according to claim 1 wherein said mounting means comprises a plurality of flexible members connected at one end thereof to said sleeve and extending outwardly therefrom and approximately forming a shape substantially equivalent to the center opening of a coil; and at least one flange on the other end of each flexible member and directed outwardly from the shape formed by said member, for gripping a coil.

3. A loading coil structure comprising:

a multiple-conductor cable;

a sleeve around said cable;

at least one mount integral with said sleeve and extending outwardly from said sleeve and said cable; and a loading coil having a central opening, said loading coil mounted on said mount with said mount extending through the opening in said loading coil with the wires of said loading coil connected to conductors in said cable.

4. A structure according to claim 3 further comprising a terminal board mounted to said loading coil and positioned beyond said mount, said terminal board having at least one terminal mounted thereon and extending away from said loading coil, one wire of said loading coil fastened to the terminal and one conductor of said cable also fastened to the terminal.

5. A structure according to claim 3 wherein:

said sleeve is provided with areas of reduced thickness at each end thereof for cooperation with like sleeves on said cable and for nesting therewith, said sleeve having at least one notch at one end thereof extending at least part way along the length thereof and beyond the area of reduced thickness at the one end of said sleeve with a conductor of said cable extending through the notch.

6. A structure according to claim 3 wherein said mount is at least partially bifurcated and the two parts thereof are capable of being flexed together to facilitate mounting and removal of said loading coil, and in the relaxed position of the two parts of said mount the easy removal of said loading coil is precluded.

7. A structure according to claim 6 wherein said mount has flanges extending substantially perpendicular to the outwardly-extending direction of said mount, for overlapping and retaining said loading coil on said mount.

References Cited

UNITED STATES PATENTS

| | | | |
|---|---|---|---|
| 2,167,379 | 7/1939 | Tolson | 336—225 X |
| 2,574,330 | 11/1951 | Judd | 24—259 X |

FOREIGN PATENTS

| | | |
|---|---|---|
| 366,791 | 2/1932 | Great Britain. |

ELI LIEBERMAN, Primary Examiner

M. NUSSBAUM, Assistant Examiner

U.S. Cl. X.R.

174—70, 138; 336—65, 208